United States Patent [19]
Krikor et al.

[11] Patent Number: 4,499,336
[45] Date of Patent: Feb. 12, 1985

[54] COMMON CHANNEL INTEROFFICE SIGNALING SYSTEM

[75] Inventors: Agop K. Krikor, Glendale; Sergio E. Puccini, Scottsdale, both of Ariz.

[73] Assignee: GTE Automatic Electric Inc., Northlake, Ill.

[21] Appl. No.: 437,646

[22] Filed: Oct. 29, 1982

[51] Int. Cl.³ .................. H04M 7/06; H04Q 3/54
[52] U.S. Cl. ......................... 179/18 ES; 179/18 EE
[58] Field of Search ......... 179/18 EE, 18 EA, 18 ES; 370/58, 63

[56] References Cited

U.S. PATENT DOCUMENTS

| | | | |
|---|---|---|---|
| 4,371,754 | 2/1983 | De et al. | 179/18 EE |
| 4,466,062 | 8/1984 | Krikor | 364/200 |

OTHER PUBLICATIONS

*GTD-5 EAX Hardware Description*, Jinboand Magnusson, 1980 Int'l Conf. on Communications, Jun. 1980, pp. 18.3.1–7.

*Primary Examiner*—Thomas W. Brown
*Attorney, Agent, or Firm*—Frank J. Bogacz; Peter Xiarhos

[57] ABSTRACT

A modular Common Channel Interoffice Signaling (CCIS) system is described for use with an electronic switching office. This system provides for minimal impact to the program instructions of the switching office. Virtually all modifiable CCIS program instructions are contained within the CCIS system. Therefore, any feature changes or additions to the CCIS system affect only the CCIS system and not the switching office. In addition, the central processing arrangement of the present CCIS system operates a large number of analog and/or digital transmission devices for CCIS data transfer.

7 Claims, 2 Drawing Figures

COMMON CHANNEL INTEROFFICE SIGNALING SYSTEM

This application is related to application Ser. No. 412,617, now U.S. Pat. No. 4,466,062.

BACKGROUND OF THE INVENTION

The present invention pertains to data transmission between switching offices and more particularly to an arrangement for Common Channel Interoffice Signaling for use in a switching system.

Common Channel Interoffice Signaling (CCIS) is a relatively new signaling arrangement in which signaling and supervisory data, usually sent by the voice trunks, is transmitted via data links between switching offices. Previous telephone switching systems implemented the CCIS feature through the use of CCIS data links directly operated by the common control processor of the switching office.

CCIS is a relatively new telephony feature which has a broad range of potential uses. The CCIS feature is constantly being redefined and enhanced. It is expected that other uses of this feature will be found for many years to come.

In the traditional arrangement of the CCIS system discussed above, any change made to the CCIS feature severely impacted the program of the switching office's common control processor. Such modifications are costly in terms of reprogramming costs.

Accordingly, it is the object of the present invention to provide a CCIS system for use in a switching office while permitting feature changes and modifications to the CCIS system with minimal impact on the switching office.

SUMMARY OF THE INVENTION

A Common Channel Interoffice Signaling (CCIS) system is connected to a switching network and to a processor complex of a telephone switching office. Two groups of terminal equipment connect the CCIS system to other switching offices. The terminal equipment controls the transmission of CCIS data between the connected switching offices.

Two CPUs are connected to the processor complex of the switching office and these CPUs are operated with one CPU being active and the other CPU being a ready standby. Two CPU buses are respectively connected to the two CPUs and provide for interfacing the other units of the CCIS system with the CPUs. Bus crossover units are connected to each of the CPUs via the CPU buses. The bus crossover units operate to connect one CPU to the other CPU's bus.

Two bus extenders are each connected to the bus crossover units. The bus extender units operate to provide for connecting the CPU buses to the two groups of terminal equipment. Thereby, the active CPU is able to be connected to any of the terminal equipment of the first or second groups. Two multiplexers are connected to each of the bus extenders. One multiplexer provides for connecting any of the terminal equipment of the first group to the active CPU and the other multiplexer provides for connecting any of the terminal equipment of the second group to the active CPU.

Two groups of buffer interface units are respectively connected to the two groups of terminal equipment. One particular buffer interface unit is connected to one terminal equipment in the respective group. One group of buffer interface units is connected to each of the multiplexers. Each of the buffer interface units operates to store CCIS data and then to forward this data to either the active CPU or to the particular terminal equipment for transmission to other switching offices.

The CCIS system also includes two groups of control circuits corresponding to the two groups of terminal equipment and to the two groups of buffer interface units. Each control circuit is connected between one particular buffer interface unit and one particular terminal equipment. The control circuit performs all data transfer between the corresponding terminal equipment and buffer interface unit.

Each of the buffer interface units is cyclically operated to transmit the CCIS data which was received from the corresponding control circuit to the active CPU. Each of the buffer interface units is also cyclically operated to transmit CCIS data received from the active CPU to a particular terminal equipment via its corresponding control circuit.

DESCRIPTION OF THE PREFERRED EMBODIMENT

Figure 1:
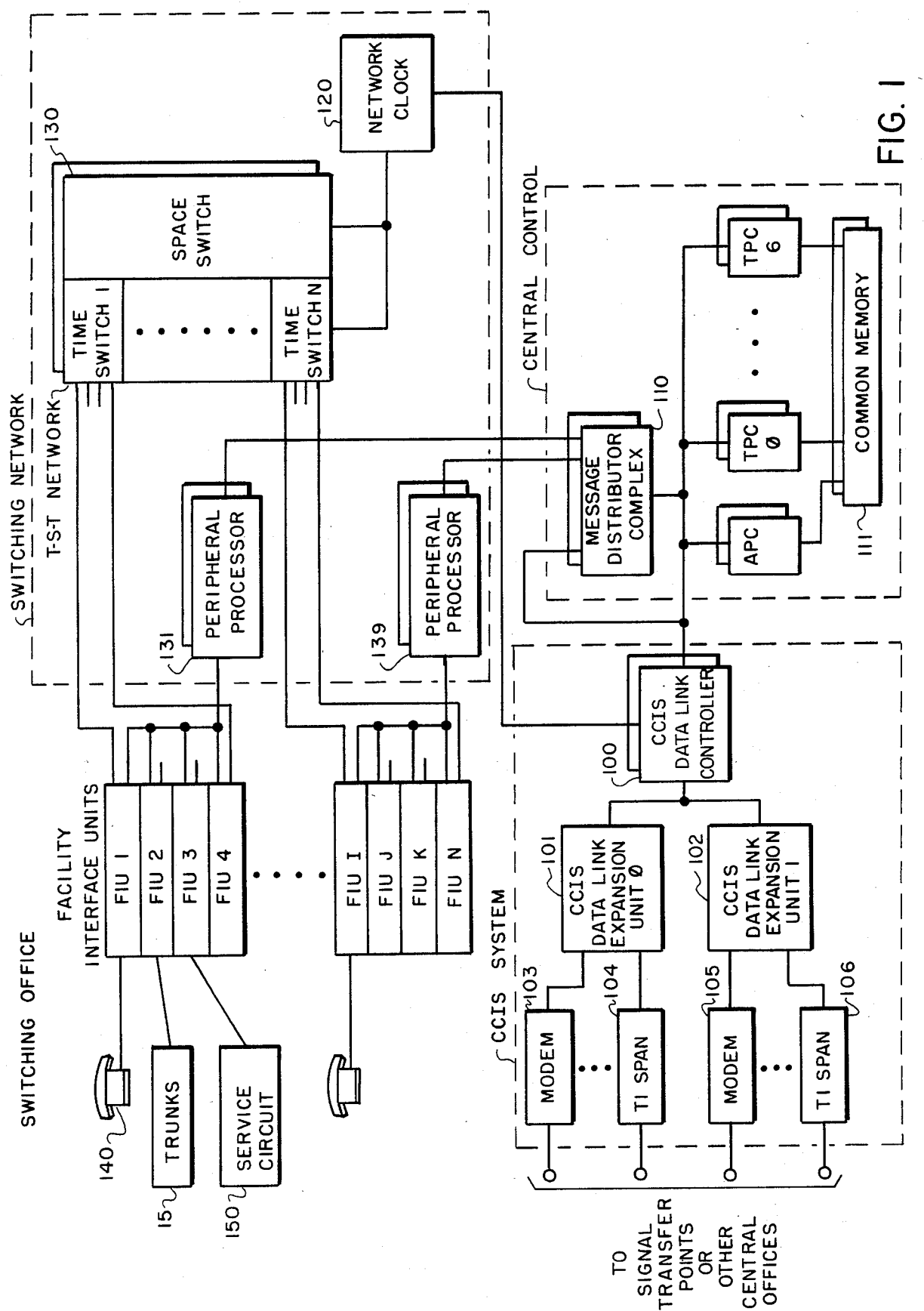
FIG. 1 is a block diagram of a switching office including the Common Channel Interoffice Signaling (CCIS) system.

Referring to FIG. 1, a telephone switching office is shown. The telephone switching office includes a switching network, central control, a number of facility interface units and a Common Channel Interoffice Signaling (CCIS) system. A facility interface unit (FIU) may connect telephone subscribers 140, trunks 15, service circuits 150 or other equipment to the switching office. The FIUs are connected to peripheral processors such as, peripheral processors 131 and 139. These peripheral processors provide for controlling the operation of the FIUs. The FIUs are connected to the T-S-T network 130 and the FIUs operate to transmit and receive data from the network 130. Network clock 120 provides for the proper timing of network 130 via synchronizing clock signals.

The central control of the switching office includes a message distributor complex 110 connected to the peripheral processors 131 and 139. A number of duplicated central processing units are connected between message distributor complex 110 and common memory 111. The administrative processor complex (APC) provides for all the administrative and maintenance functions concerned with the switching office. A variable number of telephone processor complexes (TPC) provides for the operation of the telephony related features of the switching office. All the units of the switching network and central control are duplicated for reliability.

The CCIS system is shown connected between other switching offices or signal transfer points and the message distributor complex 110 and network clock 120 of the switching office. The CCIS system is controlled by a duplicated pair of CCIS data link controllers 100. The CCIS data link controllers 100 are connected to the message distributor complex 110 and to the network clock 120. Controllers 100 provide for the transfer of data between other switching offices and the message distributor complex 110. The network clock 120 provides controllers 100 with the appropriate clock signals for the synchronous recovery or transmission of the CCIS data. The CCIS data link controller 100 includes a pair of Intel 8086 microprocessor CPUs. Intel is a registered trademark of the Intel Corporation.

Controllers 100 are connected to CCIS data link expansion units 0 and 1; 101 and 102 respectively. Each expansion unit provides for connecting a number of terminal equipment to the switching office.

CCIS data may be transmitted in an analog mode from other switching offices via modems 103 or 105, for example. In addition, digital data may be transmitted via any of a number of T1 spans such as 104 or 106. Up to eight modems and/or T1 spans may be connected to each CCIS data link expansion unit.

Figure 2:
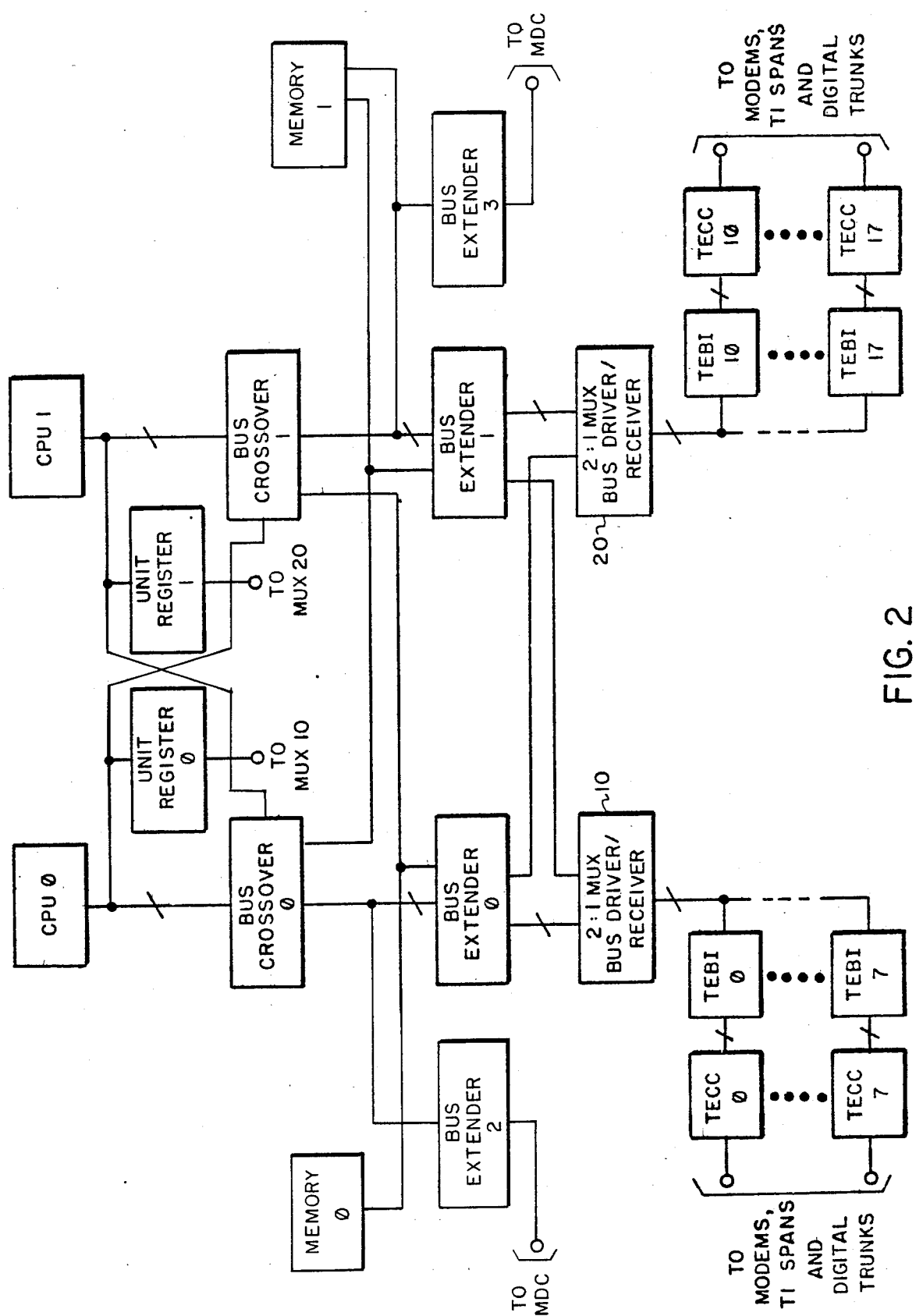
FIG. 2 is a block diagram of the CCIS system in accordance with the principles of operation of the present invention.

Referring to FIG. 2, the CCIS system of FIG. 1 is shown in detail. CPUs 0 and 1 provide for control of the data transfer between the switching office and other switching offices or signal transfer points. Only one of these CPUs is active at a particular time. The other CPU is a backup processor which operates upon detection of a fault of the active CPU. The backup CPU is a "hot" standby processor which runs self-diagnostics until such time as it becomes active and the other CPU becomes a standby processor.

CPUs 0 and 1 function to collect data received or transmitted to or from analog and digital sources such as, modems and T1 spans or digital trunk units. This CCIS data is collected, analyzed and retransmitted to the message distributor complex 110 of FIG. 1 for use by the telephone processor complexes.

CPUs 0 and 1 are respectively connected to bus crossovers 0 and 1 via the corresponding CPU buses. Bus crossovers 0 and 1 provide for CPU 0 to control the bus circuitry of CPU 1 and vice versa. Each bus crossover is connected to all other bus extenders via each of the CPU buses. Bus extenders 0 through 3 provide for a multiplicity of bus connections to each CPU's address and data buses. Bus extenders 2 and 3 provide for the connection of either CPU 0 or 1 to the message distributor complex 110, as shown in FIG. 1. In addition, memories 0 and 1 are connected via the CPU buses and bus crossovers 0 and 1 to CPUs 0 and 1. Memories 0 and 1 contain the operating program instructions and data storage necessary for CCIS data collection, analysis and transfer.

Bus extenders 0 and 1 are each connected to multiplexers 10 and 20. Multiplexers 10 and 20 are 2 to 1 multiplexers which provide for connecting the active CPU's bus structure to either group of terminal equipment. Each multiplexer may handle up to eight terminal equipments. Therefore, either CPU 0 or 1 may handle a total of up to sixteen terminal equipments.

Unit registers 0 and 1 are respectively connected between CPUs 0 and 1 and multiplexers 10 and 20. The unit registers are operated under control of the active CPU to select the particular terminal equipment which is to be connected via multiplexer 10 or 20 to the active CPU for the transfer of CCIS data.

A group of eight terminal equipment buffer interface circuits (TEBIs 0-7) are connected to multiplexer 10 and another group of TEBIs 10-17 are connected to multiplexer 20. Each TEBI is operated to store and to forward CCIS data transferred between the active CPU and a corresponding terminal equipment. Two groups of terminal equipment control circuits (TECCs 0-7 and 10-17) are connected on a one for one basis between a particular TEBI and a particular terminal equipment. Each TECC operates to control its corresponding terminal equipment. Each TECC may include an Intel 8085 microprocessor CPU. This CPU is programmed to operate a modem in an analog mode of transmission at a rate of 2400 bits per second or to operate a T1 span via a digital trunk unit at a rate of 4000 bits per second. This CPU performs such functions as: data link interface via modem or digital trunk unit; error detection and correction; data link sychronization, recovery and diagnostics functions; and buffering, reformatting and prioritizing of information.

Normally, every ten milliseconds each TEBI is scanned by the active CPU to determine whether any incoming CCIS data has been received. Any received CCIS data will be transferred to the active CPU. The TEBI can then unload the data received from other switching office by the terminal equipment. The active CPU operates each TEBI 0 through 7 and 10 through 17 on a cyclic basis as indicated above.

Each TEBI stores the CCIS data transferred from its corresponding terminal equipment or TECC. For example, TEBI 0 stores CCIS data received from its particular terminal equipment or from TECC 0. The above structure permits a great deal of CCIS data to be transmitted between a number of switching offices or signal transfer points in either analog or digital form.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a telephone switching office having a switching network and a processor complex, a CCIS system comprising:

first and second pluralities of terminal equipment for transferring CCIS data to said CCIS system from remotely located switching offices and from said CCIS system to said remotely located switching offices;

first and second CPUs including an active and a ready standby CPU, each said CPU being connected to said processor complex;

first and second CPU buses connected respectively to said first and second CPUs;

first and second bus crossovers, each bus crossover connected to said first and to said second CPUs via said respective CPU buses and said crossovers operated to connect said first CPU to said second CPU bus and said second CPU to said first CPU bus;

first and second bus extenders, each bus extender connected to said first and to said second bus crossovers, said bus extenders operated to connect said first and said second plurality of terminal equipment to said active CPU;

first and second multiplexer means connected to said first and second bus extenders, said first multiplexer means operated to connect said first plurality of terminal equipment to said active CPU, said second multiplexer means operated to connect said second plurality of terminal equipment to said active CPU;

first and second pluralities of buffer interface means corresponding to said first and second pluralities of terminal equipment, said first plurality of buffer interface means connected to said first multiplexer means, said second plurality of buffer interface means connected to said second multiplexer means, each buffer interface means operated to store and to forward said CCIS data between said active CPU and said terminal equipment;

first and second pluralities of control circuits corresponding to said first and second pluralities of terminal equipment and buffer interface means, each control circuit connected between one particular buffer interface means and one particular terminal equipment and each control circuit operated to control said CCIS data transfer between said one particular buffer interface means and said one particular terminal equipment;

each said buffer interface means is cyclically operated to transmit said CCIS data, received from said connected control circuit, to said active CPU via said corresponding CPU bus; and each said buffer interface means is cyclically operated to transmit said CCIS data, received from said active CPU, to said one particular terminal equipment via said connected control circuit.

2. A CCIS system as claimed in claim 1, wherein there is further included:

a third and a fourth bus extender connected to said first and said second bus crossovers and said processor complex, said third and fourth bus extenders operated to connect said active CPU to said processor complex;

said active CPU operated to transmit said CCIS data, received from said first and second pluralities of terminal equipment, to said processor complex; and said active CPU further operated to transmit CCIS data generated by said switching office, to each of said first and second pluralities of terminal equipment.

3. A CCIS system as claimed in claim 1, wherein there is further included:

first and second memories corresponding to said first and second CPUs, each said memory connected to said first and second CPUs via said first and second bus crossovers and said first and second CPU buses and said memories operated to store CCIS specific program instructions for execution by said active CPU.

4. A CCIS system as claimed in claim 1, wherein there is further included:

first and second registers connected respectively between said first and second CPUs and said first and second multiplexer means and each said register operated to selectively enable said active CPU to be connected to any one of said first and second pluralities of terminal equipment for enabling said CCIS data transmission from said active CPU to said one selected terminal equipment or from said one selected terminal equipment to said active CPU.

5. A CCIS system as claimed in claim 1, wherein there is further included a connection from said switching network to said first and second pluralities of terminal equipment for the transmission of a clock signal to said connected terminal equipment.

6. A CCIS system as claimed in claim 1, wherein said terminal equipment includes a modem connected to one particular control circuit for transferring said CCIS data in analog form between said telephone switching office and said remotely located switching office.

7. A CCIS system as claimed in claim 1, wherein said terminal equipment includes a T1 span connected to one particular control circuit for transferring said CCIS data in digital form between said telephone switching office and one of said remotely located switching offices.

* * * * *